3,025,169
PREPARATION OF FROZEN FRUIT
Dante G. Guadagni, Lafayette, Calif., assignor to the United States of America as represented by the Secretary of Agriculture
No Drawing. Filed Feb. 1, 1960, Ser. No. 6,075
4 Claims. (Cl. 99—193)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for preparing frozen fruits. Further objects and advantages of the invention will be evident from the following description wherein parts and percentages are by weight unless otherwise specified.

In the conventional preparation of frozen fruit—peaches, for example—the folowing procedure is used: Fresh peaches are subjected to preliminary operations which include washing, peeling, removing of pits, and cutting into slices. The peach slices are then placed in cartons, covered with a syrup containing about 50% sucrose and a small proportion of ascorbic acid. The cartons are then sealed, frozen, and maintained in frozen storage until ready for consumption. The resulting product is indeed a flavorsome and nutritious food. However, the product is not stable and upon storage the fruit slices turn brown. The rate of browning is greatly accelerated by increase in temperature. It would be expected that the ascorbic acid in the syrup would prevent this browning because of its well-known antioxidant properties. In practice, the ascorbic acid cannot protect the fruit because at least part of the fruit is simply not in contact with the ascorbic acid-containing syrup. The point is that the syrup, because of its high sucrose content, has a density much greater than that of the fruit pieces. As a result, some of the fruit pieces float above the level of syrup. The proportion of these floating pieces to the total amount of fruit depends, of course, on the free space at the top of the carton. In practice, a certain proportion of free space must be left in the carton to allow for expansion of the product when it is frozen. At any rate, these floating pieces of fruit are not in contact with the protective syrup and thus turn brown. It is further evident that as the products are handled in distribution channels, warehouses, retail freezer cabinets, home freezers, etc. the cartons will be oriented in different positions allowing different pieces of fruit to rise above the syrup, particularly if there occur even temporary increases in temperature sufficient to cause thawing of the syrup. Under these conditions, a large proportion of the fruit pieces eventually becomes brown so that the product has greatly reduced flavor and appearance.

By application of the present invention, the disadvantages outlined above are eliminated. In accordance with the invention, the fruit is packed with a protective solution which has a density less than that of the fruit. As a result, the fruit remains submerged in the solution and is thereby protected from browning or other deleterious changes. Even if the solution is liquefied by a temperature increase, the fruit remains submerged in the solution, hence protected thereby.

In applying the present invention, the fruit to be preserved is placed in suitable containers and covered with the protective solution. The container is then closed and subjected to freezing and maintained under frozen conditions until ready for use. The process may be applied to fruit of all types, for example peaches, nectarines, plums, pineapple, apples, pears, apricots, strawberries, raspberries, blackberries, grapes, etc. The fruit prior to packaging is generally subjected to the conventional preliminary operations including washing, peeling, pitting, slicing or similar operations as may be pertinent to the fruit in question. For example, small fruit such as grapes and berries would be packed whole whereas larger fruit such as peaches, apricots, etc. would be cut into pieces.

The protective solution used to cover the fruit generally contains water, ascorbic acid, and a sweetening agent. The water is required to furnish enough bulk to permit covering of the fruit and to carry the other ingredients. The ascorbic acid acts as an antioxidant to protect the fruit from browning. The proportion of ascorbic acid in the solution is generally in the range from about 0.04 to about 0.1 percent. A larger proportion of ascorbic acid may be used if desired but is not necessary for preserving the color of the fruit. The sweetening agent is provided to give the solution the degree of sweetness as may be desired. Thus various compounds and proportions thereof may be employed depending on the taste desired.

The critical factor of the protective solution is that its density be lower than that of the fruit. This desideratum cannot be attained where a sugar is used at conventional sweetness levels. Such degree of sweetness requires a syrup of about 50% sucrose and even greater concentration if sugars other than sucrose are used. These syrups have densities far above that of the fruit. Accordingly, it is preferred to employ the non-caloric, ingestible sweeteners which will provide solutions of the proper degree of sweetness yet of density less than that of the fruit. Among the compounds which fulfill these requirements are sodium cyclamate (sodium cyclohexylsulphamate), calcium cylamate (calcium cyclohexylsulphamate), saccharin, and saccharin sodium. These compounds exhibit such a high degree of sweetness that dilute solutions thereof having substantially the same density as water itself will provide the proper degree of sweetness to the packed fruit. As noted hereinabove, the concentration of the sweetening agent in the protective solution may be varied according to the taste desired in the packed fruit. However, in no case should so much of the sweetener be used as to increase the density of the solution above that of the fruit. The possibility of this occurring is out of the question in practical consideration because such a high concentration of sweetener would render the product so exceedingly sweet as to be unpalatable.

The protective solution, in addition to the water, ascorbic acid, and non-caloric, ingestible sweetener, may contain any desired food ingredient or mixture of food ingredients. Examples of food ingredients which may be incorporated in the protective solution are set forth below:

Flavoring substances: Sucrose, dextrose, fructose, maltose, invert sugar, corn syrup, molasses, maple sugar, or syrup, etc. Particularly desirable are fruit juices, concentrated fruit juices, and especially full-flavored concentrates, that is, those in which the volatile essences usually lost in evaporative processes are recovered by condensation or other techniques and returned to the concentrate. Fruit juice concentrates are desirable in that they not only add their sweetening effect but also the characteristic fruity taste so that the flavor of the product is intensified. Other flavoring agents which may be employed are spices, salt, citric acid, alcoholic extracts of vanilla, lemon, mint, etc., synthetic flavorings such as vanillin and methyl anthranilate, natural fruit essences such as those recovered by condensation from the vapors evolved in the evaporation of fruit juices, etc.

Nutritive substances: Vitamins, vitamin precursors, mineral salts, proteins, protein hydrolysates, solubilized starch, etc.

Coloring materials: Dyes suitable for food use, juices or extractions from highly pigmented fruits or vegetables, for instance, Concord grape juice.

Preserving agents: Browning inhibitors as sodium sulphite, sodium bisulphite, lemon juice, etc. Agents for preventing or inhibiting microbial spoilage such as sodium benzoate, sodium parahydroxybenzoate, antibiotics, etc.

Agents for firming the texture of the fruit such as calcium chloride, pectin, low-methoxyl pectins, methyl cellulose, etc.

Agents for thickening the liquid surrounding the fruit such as gelatin, tragacanth, soluble starch, pectins, algins, etc.

It is evident from the above that the food ingredients to be added to the preservative solution may be chosen as desired for any particular function and in any case the total amount of material added to the solution should be limited so that the density of the solution remains below that of the fruit to be preserved.

In one modification of the invention, the fruit is de-aerated prior to being covered with the preservative liquid. By removal of air from the fruit tissues, the density of the fruit is increased so that one is assured that the fruit will remain submerged in the preservative liquid. Although the de-aeration may be carried out in various ways, it is preferred to employ a vacuum technique whereby removal of air may be accomplished rapidly. To this end, the fruit pieces are placed in a bath of an edible liquid in a closed vessel which is subjected to a vacuum to remove most of the air from the fruit tissue. Then the vacuum is broken whereupon the edible liquid rapidly fills the tissue interstices formerly occupied by air. The edible liquid employed in this procedure may be plain water or an aqueous solution containing sweetening agents, preservative agents, etc. Usually the same preservative liquid as used in packing the fruit is used as the edible liquid in the vacuum de-aeration steps.

The invention is further demonstrated by the following illustrative examples:

Example I

Fresh Elberta peaches were steam-peeled, sliced into twelfths, and packed into 1-pound waxed paper tubs provided with slip-on covers.

(A) In one set of samples, the peach slices were covered with 50% sucrose syrup containing sufficient ascorbic acid to provide 200 mg. thereof per pound of finished pack.

(B) In another set of samples, the peach slices were covered with a water solution containing 0.2% calcium cyclamate and sufficient ascorbic acid to provide 200 mg. thereof per pound of finished pack.

It was observed that the peach slices floated in the sucrose syrup whereas in the cyclamate solution, the peach slices submerged.

The packed tubs were sealed by placing on the covers and various lots of the peaches were stored at 0°, 10°, 20°, and 30° F. At periodic intervals, the packs were opened and examined for color changes by reflectance measurements. The following data was obtained:

| Temperature of Storage, °F. | Time of Storage | Proportion of Original Color Lost by Fruit, Percent | |
|---|---|---|---|
| | | Sucrose Pack (A) | Cyclamate Pack (B) |
| 0 | 1 yr | 12 | 0 |
| 10 | 1 mo | 18 | 0 |
| 20 | 2 wks | 12 | 0 |
| 30 | 2 days | 30 | 9 |

Example II

Fresh apples were peeled, cored, and cut into slices. The apple slices were placed in a vessel and covered with an aqueous solution containing 0.2% calcium cyclamate and 0.1% of ascorbic acid. The vessel was closed and a vacuum applied to exhaust air therefrom. The vacuum was maintained until the ebullition caused by removal of air from the fruit had essentially ceased. The vacuum was then broken and the fruit pieces allowed to stand in the solution for a few minutes. The fruit pieces were then removed, packed into containers, and covered with an aqueous solution of the same composition as used in the vacuum impregnation. The containers were sealed and frozen.

Having thus defined the invention, what is claimed is:

1. A process for preserving fruits which comprises introducing fresh fruit into a container, covering the fruit with a preservative liquid, said preservative liquid containing water, a browning inhibitor, and a sweetening agent selected from the group consisting of sodium cyclamate, calcium cyclamate, saccharin, and saccharin sodium, and having a density less than that of the fruit, freezing the product and maintaining it in frozen storage.

2. The process of claim 1, wherein the browning inhibitor is ascorbic acid.

3. The process of claim 1, wherein the fruit is de-aerated prior to being covered with the preservative liquid.

4. The process of claim 1, wherein the fruit is de-aerated prior to being covered with the preservative liquid, said de-aeration being effected by exposing the fruit to vacuum then releasing the vacuum while the fruit is in contact with an edible liquid.

References Cited in the file of this patent
UNITED STATES PATENTS

| | | |
|---|---|---|
| 2,618,564 | Mills et al. | Nov. 18, 1952 |
| 2,755,190 | Oyler | July 17, 1956 |
| 2,788,281 | Guadagni | Apr. 9, 1957 |
| 2,874,059 | Powers et al. | Feb. 17, 1959 |
| 2,876,107 | Jucaitis et al. | Mar. 3, 1959 |